UNITED STATES PATENT OFFICE.

SMITH GARDNER, OF NEW YORK, N. Y.

IMPROVEMENT IN RENDERING CASKS OIL-PROOF.

Specification forming part of Letters Patent No. 50,238, dated October 3, 1865; antedated September 23, 1865.

*To all whom it may concern:*

Be it known that I, SMITH GARDNER, of the city, county, and State of New York, have invented certain new and useful improvements in rendering casks proof against leaking spirits of turpentine, petroleum, and other like substances through the pores of the wood of which they are constructed; and I do hereby declare and ascertain my said invention.

It has long been known that timber for ship-building and other purposes has been rendered impervious to water and its durability much increased by filling its pores with certain chemical compounds; but until I made the discovery, it was not known that casks could be rendered impervious to spirits of turpentine, petroleum, and other penetrating liquids by thus impregnating them. This fact, however, I have fully established, and in this consists my invention or discovery.

That others may understand how to use my invention, I proceed to describe it, and to point out the simplest and best manner of preparing casks thereby, it being understood, however, that variations may be made in the process without changing the principle.

After the casks are formed or constructed in the usual manner, I fill them with a strong solution of sulphate of iron. I then apply sufficient pressure to it (hydrostatic or other) to force it thoroughly into the pores of the wood. The solution is then drawn off and the cask treated in the same manner with a strong solution of muriate of lime. The mechanical part of the process being now completed, the casks are allowed to remain about twenty-four hours in an atmosphere not below the freezing point of water before being used, during which time decomposition of the sulphate of iron and muriate of lime with which the casks are saturated takes place, and other chemical compounds are formed in the pores of the wood, where they become fixed and solidified, and thus render the casks proof against leakage of penetrating liquids, as aforesaid. Lime-water may be used in the process instead of muriate of lime, but not with as good results.

The durability of casks thus treated is much increased thereby, and timber of inferior quality may be used in their construction.

Having thus fully described my improvement, what I claim, and desire to secure by Letters Patent, is—

Rendering casks impervious to spirits of turpentine, petroleum, and like substances by impregnating them with sulphate of iron and muriate of lime, as aforesaid, and for the purposes herein set forth.

In witness whereof I have hereunto set my hand and seal this 29th day of December, 1864.

SMITH GARDNER. [L. S.]

In presence of—
 LORENZO SHERWOOD,
 JAMES M. LATIMER.